(12) United States Patent
Salter et al.

(10) Patent No.: US 11,254,252 B1
(45) Date of Patent: Feb. 22, 2022

(54) VEHICLE ASSIST HANDLE ASSEMBLY HAVING A STORED ASSEMBLY TOOL

(71) Applicant: Ford Global Technologies, LLC, Dearborn, MI (US)

(72) Inventors: Stuart C. Salter, White Lake, MI (US); David Brian Glickman, Southfield, MI (US); Annette Lynn Huebner, Highland, MI (US); Jim Baumbick, Northville, MI (US); Paul Kenneth Dellock, Northville, MI (US); Daniel J. Martin, Plymouth, MI (US); Robert J. Gelardi, Plymouth, MI (US); Ryan A. Olsson, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 17/032,337

(22) Filed: Sep. 25, 2020

(51) Int. Cl.
*B60N 3/02* (2006.01)
*B60R 11/06* (2006.01)
*B60R 11/00* (2006.01)
*B60K 35/00* (2006.01)

(52) U.S. Cl.
CPC .............. *B60N 3/026* (2013.01); *B60R 11/06* (2013.01); *B60K 35/00* (2013.01); *B60R 2011/0007* (2013.01)

(58) Field of Classification Search
CPC ............ B60N 3/02; B60N 3/026; B60R 11/06
USPC ....................................................... 296/1.02
See application file for complete search history.

(56) References Cited

U.S. PATENT DOCUMENTS

| 6,431,643 | B2 | 8/2002 | Grey |
| 7,234,888 | B2 * | 6/2007 | Spaulding ............. F16B 5/0275 16/412 |
| 7,270,359 | B2 | 9/2007 | Sparks et al. |
| 7,400,232 | B2 | 7/2008 | Reichling et al. |
| 7,661,704 | B2 | 2/2010 | Chen et al. |
| 8,690,402 | B2 | 4/2014 | Durkin et al. |
| 8,827,516 | B2 | 9/2014 | Stakoe et al. |
| 8,922,340 | B2 | 12/2014 | Salter et al. |
| 9,079,542 | B1 | 7/2015 | Ross et al. |
| 9,849,843 | B2 * | 12/2017 | Kogut ..................... B60R 11/06 |
| 10,071,665 | B2 | 9/2018 | Ibrahim et al. |
| 10,343,575 | B1 | 7/2019 | Lynn et al. |
| 10,378,254 | B1 | 8/2019 | Salter et al. |
| 10,457,183 | B2 | 10/2019 | Frederick et al. |
| 10,604,079 | B2 | 3/2020 | Lockwood et al. |
| 10,668,847 | B2 | 6/2020 | Takenaka et al. |

(Continued)

FOREIGN PATENT DOCUMENTS

| DE | 102011112438 A1 | 3/2013 |
| DE | 102018221662 A1 | 6/2020 |

*Primary Examiner* — Jason S Morrow
(74) *Attorney, Agent, or Firm* — David Coppiellie; Price Heneveld LLP

(57) ABSTRACT

An assist handle assembly for a vehicle is provided that includes an assist handle configured to be gripped by a user, a releasable connector configured to secure the assist handle assembly to a structural component of the vehicle, the connector comprising a fastener having a key surface, a storage compartment provided in the assist handle, and an assembly tool for engaging the key surface of the fastener during assembly and disassembly of the connector from the structural component of the vehicle, wherein the assembly tool is stored in the storage compartment.

20 Claims, 7 Drawing Sheets

(56) References Cited

U.S. PATENT DOCUMENTS

| | | | |
|---|---|---|---|
| 11,084,585 B2* | 8/2021 | Jolley | B60R 7/10 |
| 2004/0145457 A1 | 7/2004 | Schofield et al. | |
| 2012/0325877 A1* | 12/2012 | Franks | B60R 11/06 224/404 |
| 2015/0330112 A1 | 11/2015 | Van Wiemeersch et al. | |
| 2019/0061631 A1 | 2/2019 | Lockwood et al. | |
| 2019/0308566 A1* | 10/2019 | Blom | B60R 22/18 |
| 2021/0146848 A1* | 5/2021 | Saito | B60R 7/04 |

* cited by examiner

VEHICLE ASSIST HANDLE ASSEMBLY HAVING A STORED ASSEMBLY TOOL

FIELD OF THE DISCLOSURE

The present disclosure generally relates to assist handles, and more particularly relates to a vehicle mounted assist handle assembly having an accessory.

BACKGROUND OF THE DISCLOSURE

Automotive vehicles are commonly equipped with handle structures referred to as passenger assist handles for passengers to grasp with their hand when entering and exiting the vehicle and during maneuvering of the vehicle. Assist handles can be particularly useful for off-road-style vehicles while driving on rough road conditions. In off-road style vehicles and other types of vehicles, it may be desirable to provide an accessory with the assist handle, particularly for customizable vehicle interiors.

SUMMARY OF THE DISCLOSURE

According to a first aspect of the present disclosure, an assist handle assembly for a vehicle is provided. The assist handle assembly for a vehicle includes an assist handle configured to be gripped by a user, a releasable connector configured to secure the assist handle assembly to a structural component of the vehicle, the connector comprising a fastener having a key surface, a storage compartment provided in the assist handle, and an assembly tool configured for engaging the key surface of the fastener during assembly and disassembly of the connector from the structural component of the vehicle, wherein the assembly tool is stored in the storage compartment.

Embodiments of the first aspect of the disclosure can include any one or a combination of the following features:
  the storage compartment has a cover;
  the storage compartment further comprises a holder within the storage compartment for holding the assembly tool;
  the assembly tool comprises a screwdriver;
  the assembly tool comprises a wireless communication device for communicating with a wireless communication device on the vehicle to determine if the assembly tool is located on the assist handle assembly;
  the wireless communication device comprises a wireless signal transmitter;
  the assembly tool further comprises a battery;
  the wireless communication device on the vehicle communicates with a controller to determine the location of the assembly tool;
  the controller processes a wireless signal received from the assembly tool and determines the location based on strength of the wireless signal;
  the vehicle has a plurality of signal receivers for receiving the wireless signal, and wherein the controller determines the location based on signal triangulation;
  an output device for indicating the location of the assembly tool; and
  the output device comprises a display.

According to a second aspect of the present disclosure, an assist handle assembly for a vehicle is provided. The assist handle assembly for a vehicle includes an assist handle configured to be gripped by a user, a releasable connector configured to secure the assist handle assembly to a structural component of the vehicle, the connector comprising a fastener having a key surface, a storage compartment provided in the assist handle, the storage compartment having a cover and a holder, and an assembly tool configured for engaging the key surface of the fastener during assembly and disassembly of the connector from the structural component of the vehicle, wherein the assembly tool is stored on the holder in the storage compartment.

Embodiments of the second aspect of the disclosure can include any one or a combination of the following features:
  the assembly tool comprises a screwdriver;
  the assembly tool comprises a wireless communication device for communicating with a wireless communication device on the vehicle to determine if the assembly tool is located on the assist handle assembly;
  the wireless communication device comprises a wireless signal transmitter;
  the assembly tool further comprises a battery;
  the wireless communication device on the vehicle communicates with a controller to determine a location of the assembly tool;
  an output device for indicating the determined location of the assembly tool; and
  the output device comprises a display.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
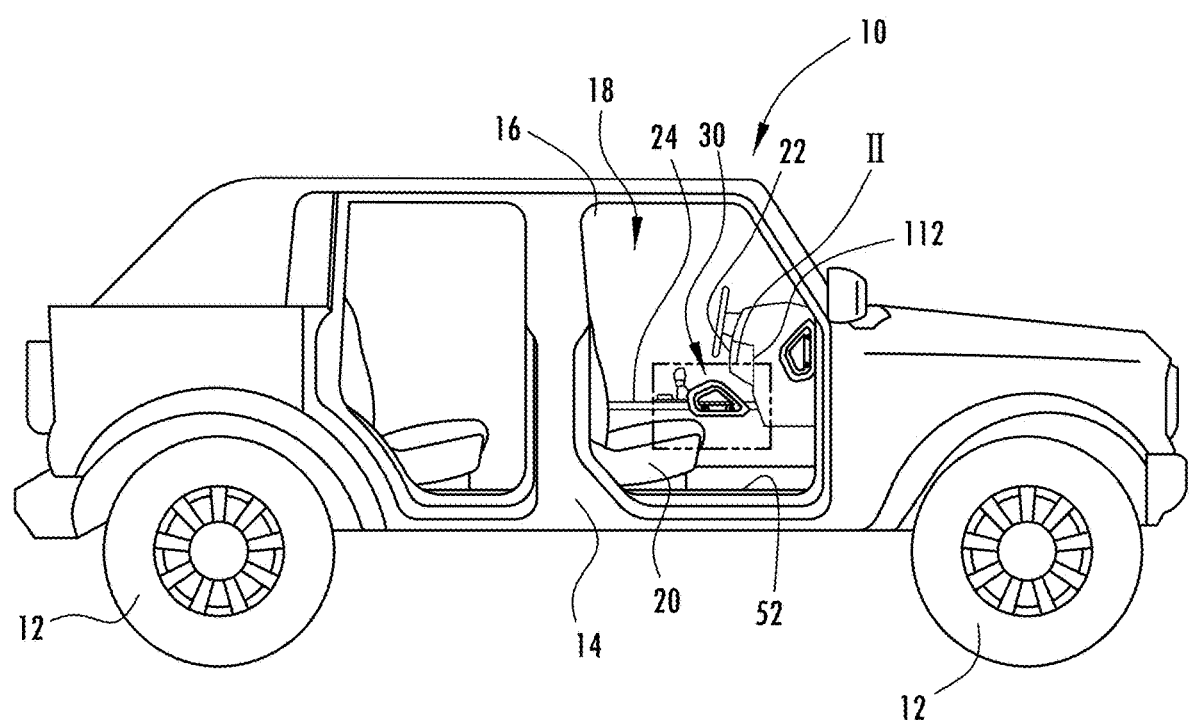
FIG. 1 is a perspective view of a motor vehicle that is configured to include one or more assist handle assemblies.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle assist handle assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, an assist handle assembly 30 for a vehicle 10 is illustrated having an assist handle configured to be gripped by a user, a releasable connector configured to secure the assist handle assembly to a structural component of the vehicle with the connector comprising a fastener having a key surface, a storage compartment provided in the assist handle and having a cover and a holder, and an assembly tool configured for engaging the key surface of the fastener during assembly and disassembly of the connector from the structural component of the vehicle, wherein the assembly tool is stored in the storage compartment.

With particular reference to FIG. 1, one example of a motor vehicle 10 is generally illustrated. The motor vehicle 10 is generally shown as an off-road style, wheeled vehicle that may be driven on a roadway or driven off-road on various types of terrain. The motor vehicle 10 generally includes a plurality of road wheels 12 and a vehicle body 14 generally defining a passenger compartment 18 with ingress/egress openings 16 which may be closed with doors. The doors may include hingedly connected door panels with windows or crossbars having exposed openings that may be fixedly installed or removable, according to various examples. While a wheeled vehicle is generally shown and described herein, it should be appreciated that other vehicles such as boats, trains, planes and other vehicles may be equipped with the assist handle assembly 30.

The motor vehicle 10 is configured to include one or more seats 20 for holding passengers seated within the passenger compartment 18 of the vehicle 10. In a typical passenger vehicle seating arrangement, a front row of bucket seats may include two seats spaced apart and the second row may have a bench seat configuration that may include a row of three seats or may include two seats separated by a rear center console. The front row seats 20 are generally rearward of a dashboard 22. A front center console 24 is shown located centrally within the front row of seats 20 between a driver seat and a passenger seat. The center console 24 may be configured with storage compartments, drink holders and other features. An assist handle assembly 30 is shown connected to the center console 24 proximate an upper side of a side wall 26, according to one embodiment.

Figure 2:
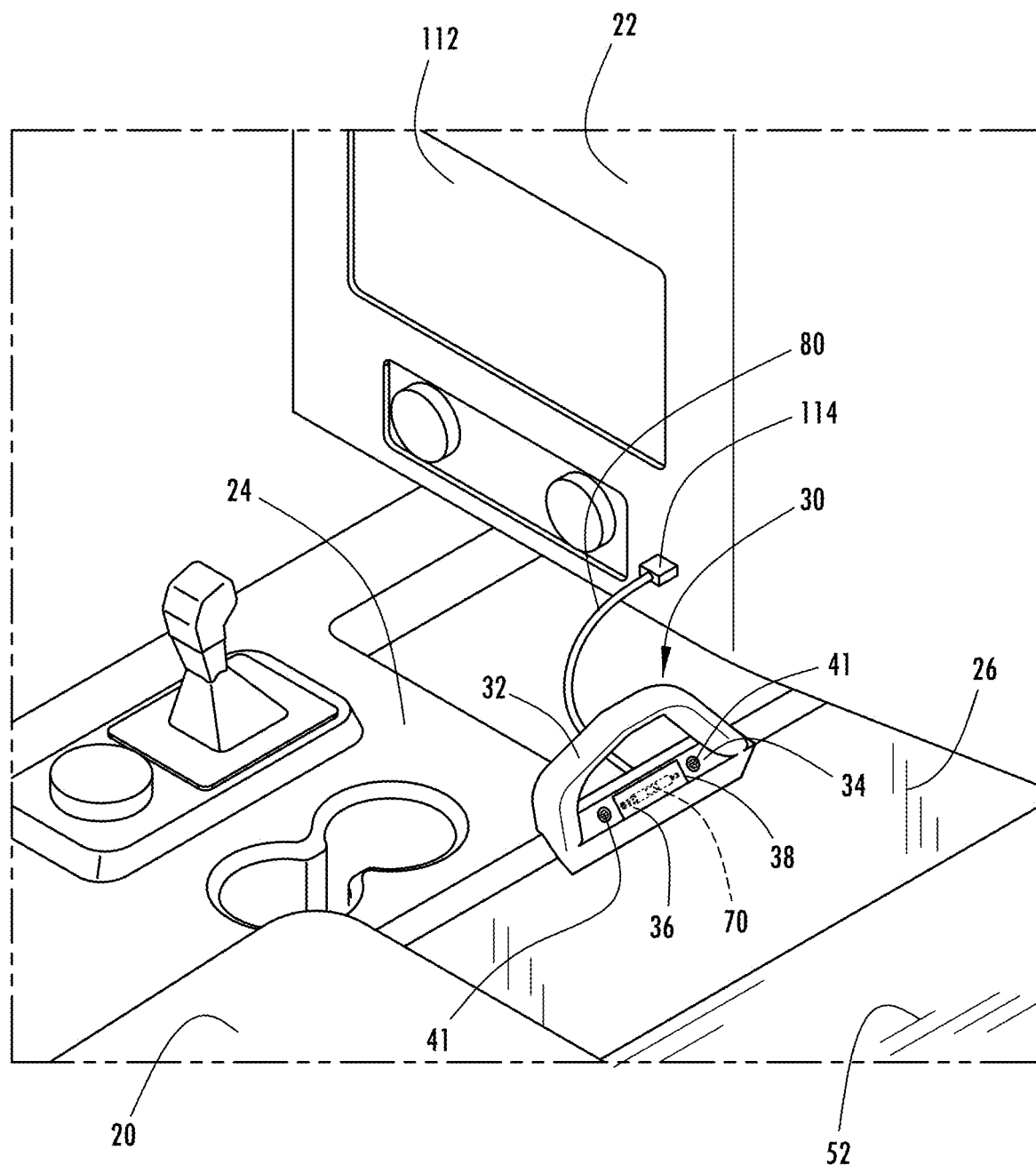
FIG. 2 is a right side perspective view of the interior of the vehicle illustrating an assist handle assembly having a storage compartment and tool and located near a center console of the vehicle, according to one embodiment.
Figure 3:
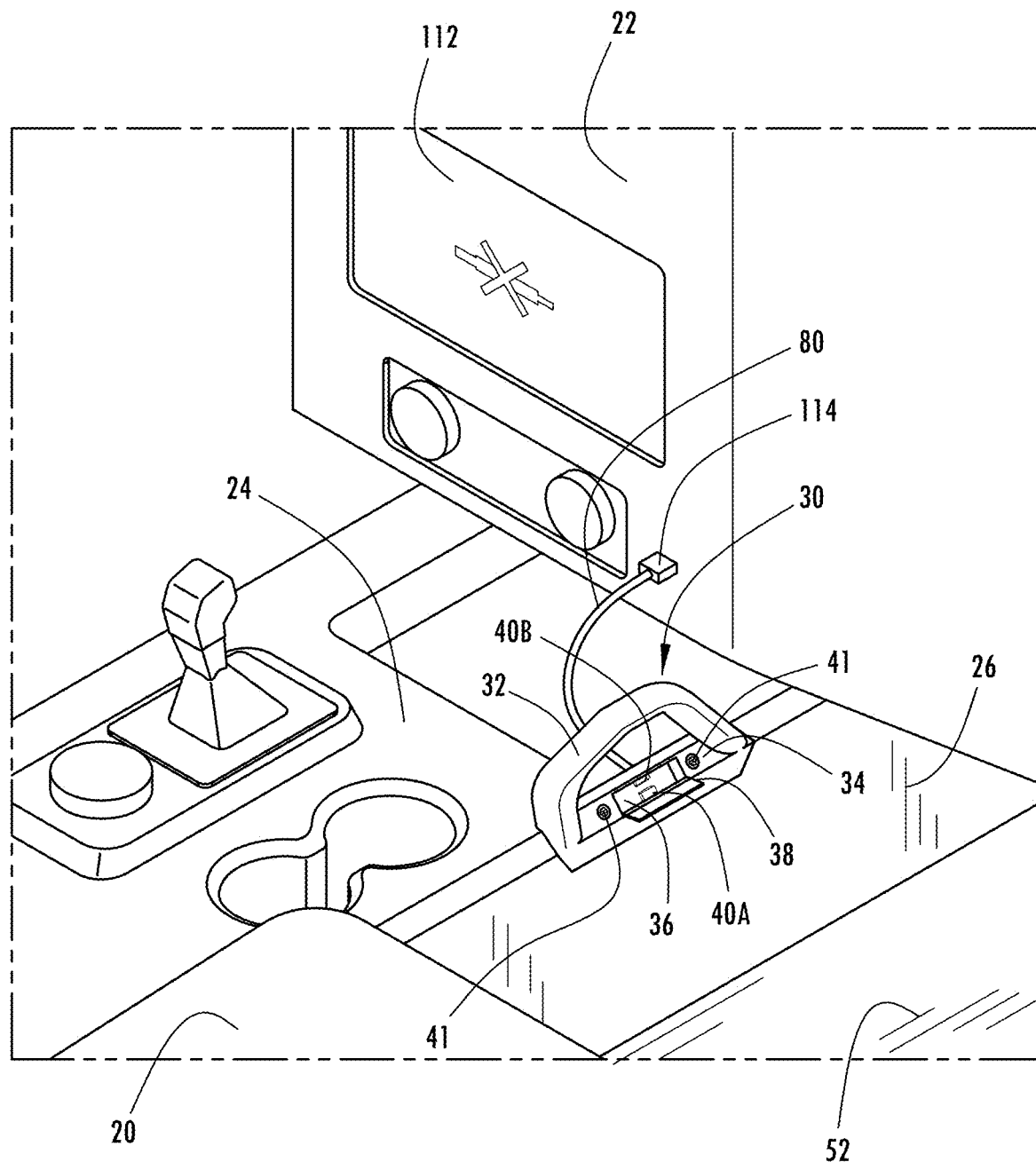
FIG. 3 is a right side perspective view of the assist handle assembly of FIG. 2 with the storage compartment having a cover shown in an open position.

Referring to FIGS. 2 and 3, the assist handle assembly 30 is shown assembled onto a passenger side of the center console 24 and positioned to enable a passenger seated on seat 20 to engage and grip the assist handle assembly 30 with a hand for support while entering the vehicle and while traveling in the vehicle 10. For example, when the vehicle 10 is traveling off-road on rough terrain, a passenger seated on the passenger seat 20 may grip the assist handle assembly 30 for purposes of maintaining balance and stability. While the assist handle assembly 30 is shown located on the passenger or right side of the center console 24, it should be appreciated that the assist handle assembly 30 may be located on the driver or right side of the center console 24, on the vehicle body side of a passenger seat, in the rear row of seating such as on a rear center console or at other locations within the vehicle 10.

The assist handle assembly 30 includes a handle base 34 that connects to the center console 24 and an assist handle 32 designed to receive and support a user's hand gripped thereto. The handle base 34 is connected to the center console 24 via an underlying bracket and fasteners 41 as shown and described herein. The assist handle assembly 30 serves both as an assist handle and an assembly tool holder holding an assembly tool that is configured to be used for assembly and disassembly of the assist handle assembly 30 from a structural component of the vehicle 10.

Figure 4:
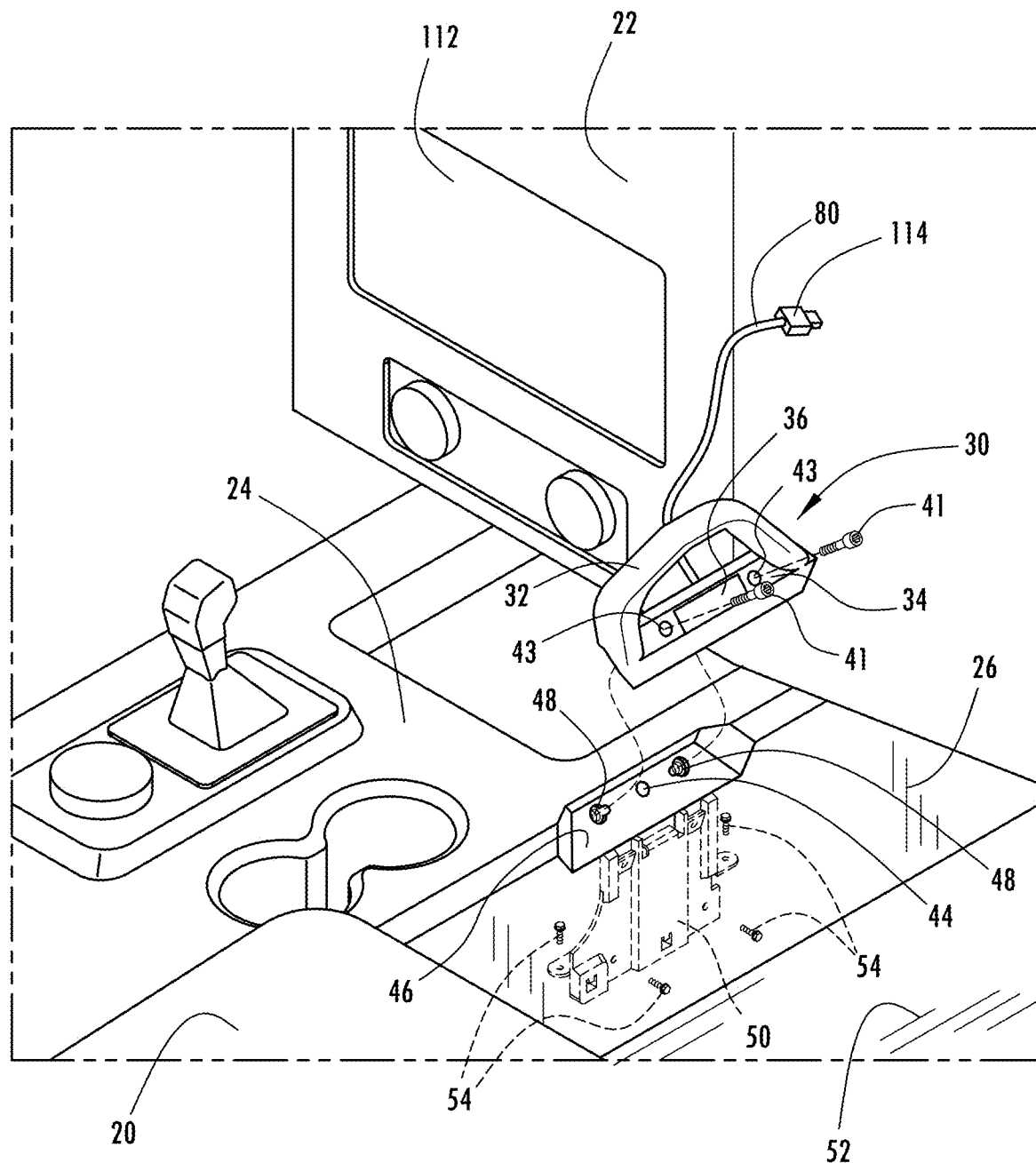
FIG. 4 is an exploded view of the assist handle assembly showing the mounting arrangement onto the center console of the vehicle.

The assist handle assembly 30 is shown in an unassembled state in FIG. 4 for mounting onto a bracket 50 in the center console 24. A pair of threaded fasteners, such as screws 41, extend through openings 43 within the handle base 34 and into threaded recesses 48 in the top plate 46 of bracket 50. The bracket 50 may, in turn, extend to a rigid support structure component such as a vehicle floor 52 where the bottom end of the bracket 50 may be fastened to the floor 52 via threaded fasteners 54. As such, the assist handle assembly 30 is rigidly attached onto the bracket 50 which is fixedly supported by a rigid floor structure component of the vehicle 10 to allow the assist handle to withstand forces experienced during normal use of the assist handle assembly 30.

The releasable connector shown in one embodiment configured as a pair of fasteners 41 may be embodied as one or more screws each having a threaded shaft and an enlarged screw head on one end with a key surface designed to matingly engage the key surface 74 on the assembly tool 70. As such, the assembly tool 70 may be employed as a screwdriver to engage the screw head on the fasteners 41 and rotate the fasteners 41 clockwise or counterclockwise to screw or unscrew the fasteners 41 extending into threaded recesses 48 to thereby assembly or disassemble the assist handle assembly 30. It should be appreciated that the releasable connector may include one or more screws, according to one embodiment or may include other fasteners such as bolts and other fastening devices that may be manipulated by the assembly tool 70 to assemble or disassemble the assist handle assembly 30.

Figure 5A:
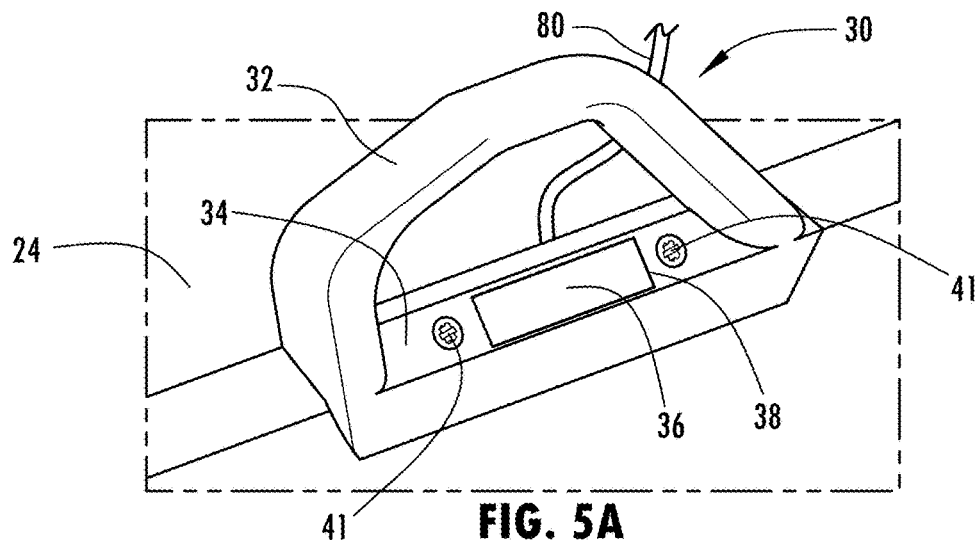
FIG. 5A is a perspective view of the assist handle assembly of FIG. 2 with the storage compartment cover shown in the closed position.
Figure 5B:
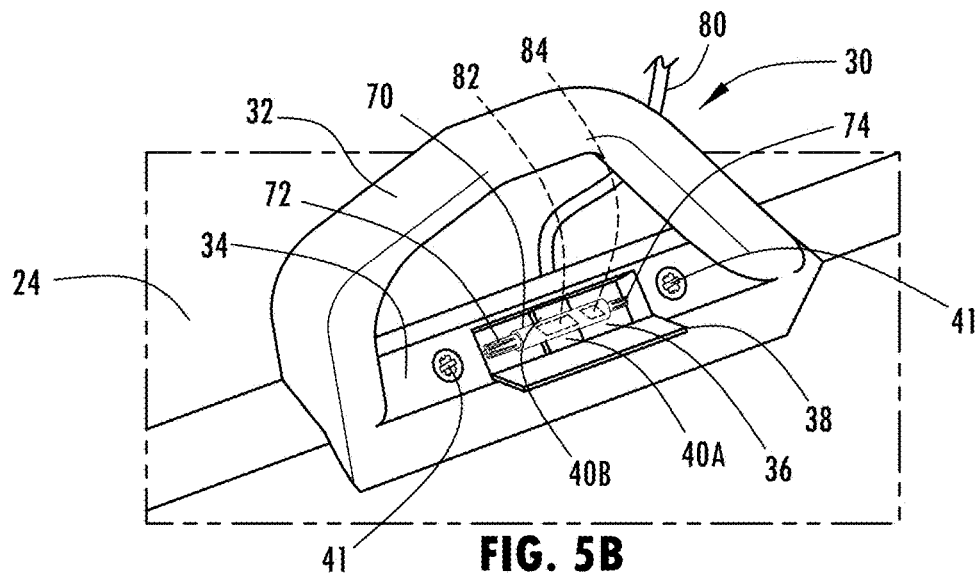
FIG. 5B is a perspective view of the assist handle assembly of FIG. 2 with the storage compartment cover shown in the open position.
Figure 5C:
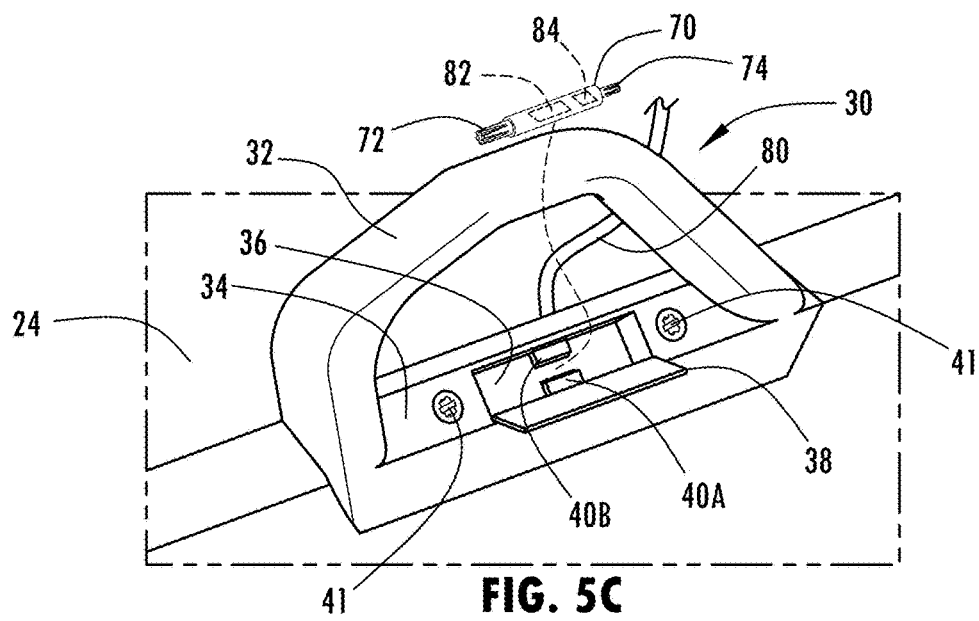
FIG. 5C is a perspective view of the assist handle assembly of FIG. 2 with an assembly tool shown removed from the storage compartment.

The assist handle assembly 30 is further illustrated in FIGS. 5A-5C with the assembly tool 70 removably stored within the storage compartment 36 located in the handle base 34. The storage compartment 36 is shown as a rectangular compartment formed in a top surface of the handle base 34. The storage compartment 36 has a cover 38 that may pivot between an open position as seen in FIGS. 5B and 5C and a closed position as shown in FIG. 5A. The storage compartment 36 has a holder configured as a pair of opposing retention members 40A and 40B that may engage and hold the assembly tool 70 in a fixed position within the storage compartment 36 during normal vehicle travel. The cover 38 may pivot about a longitudinal end to the closed position shown in FIG. 5A to cover the storage compartment 36 and assembly tool 70 from visible sight of a passenger or passersby.

The assembly tool 70 is shown embodied as a screwdriver in FIG. 5C having a handle 72 at one end and a key engagement surface 74 located at the opposite other end. The key engagement surface 74 has an outward or inward extending surface pattern that matches the pattern of the key surface on fasteners 41 such that the key engagement surface 74 may engage the fasteners to allow a user to forcibly turn the fasteners to disassemble the assist handle assembly 30 from the underlying bracket and to assemble the assist handle assembly 30 onto the bracket. In effect, the assembly tool 70 may be a screwdriver having a known or unique keyed surface. As such, a user may remove the hidden assembly tool 70 from the storage compartment 36 and engage the fasteners 41 for assembly and disassembly of the assist handle assembly 30.

The assembly tool 70 is also shown having wireless communication circuitry 84 and a battery 82 for supplying power to the wireless communication circuitry 84. The wireless communication circuitry 84 may include short range low power transmitter circuitry such as Bluetooth® (BLE) that may transmit a wireless radio frequency (RF) signal which may be received by wireless circuitry in the vehicle controller. Alternatively, the wireless communication circuitry 84 may include transceiver circuitry that may transmit and receive signals. By transmitting a short range wireless signal, the location of the assembly tool 70 may be determined by processing one or more signals received by one or more receivers on the vehicle 10. For example, a plurality of receivers within the vehicle 10 may receive the wireless signal transmitted with the wireless communication circuitry 84 and may determine a location of the assembly tool 70 by processing the amplitude of the signal and using signal triangulation from the signal received by each of a plurality of receivers. The signal received by each receiver may be processed to determine a location or distance of the assembly tool 70 from each receiver based on amplitude of the signal and/or time of flight of the signal. Using signal triangulation, signals received at a plurality of receivers may perform triangulation to determine a more precise location of the assembly tool 70 based on the received plurality of signals.

Figure 6A:
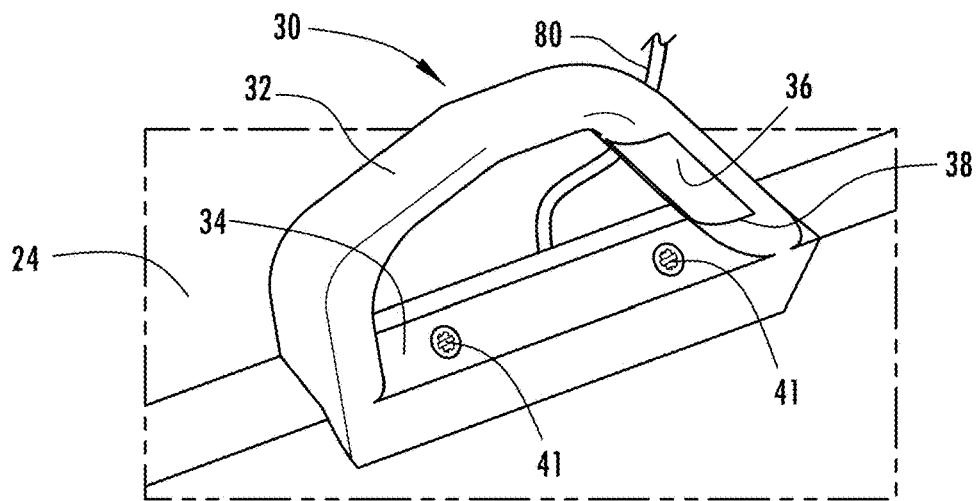
FIG. 6A is a perspective view of an assist handle assembly with a storage compartment located on the assist handle, according to another embodiment.
Figure 6B:
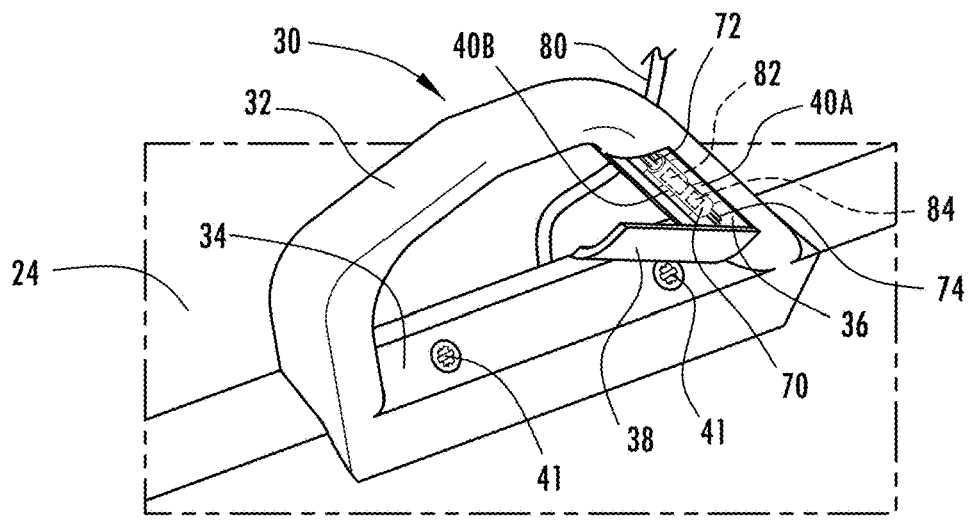
FIG. 6B is a perspective view of the assist handle assembly of FIG. 6A with the storage compartment cover shown in the open position.
Figure 6C:
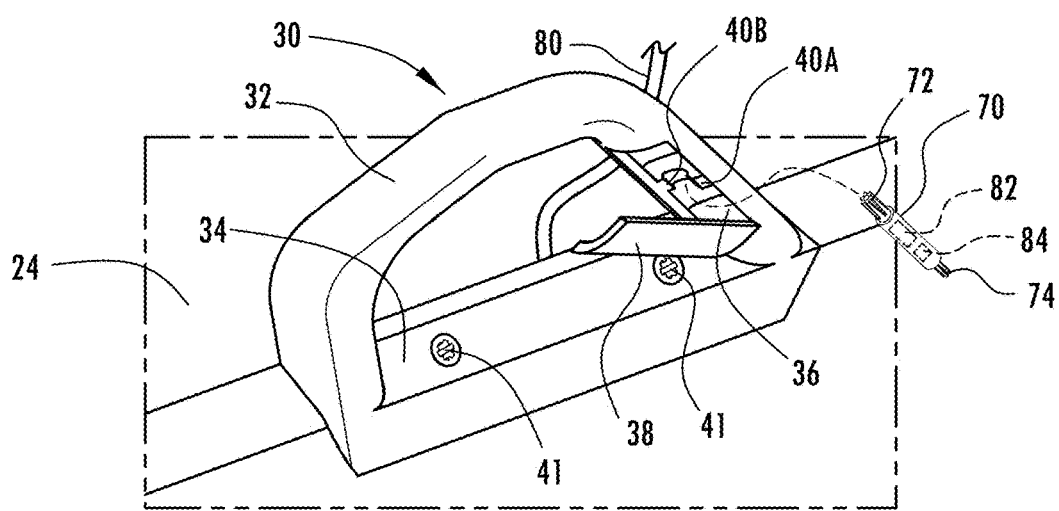
FIG. 6C is a perspective view of the assist handle assembly of FIG. 6A with the assembly tool shown removed from the storage compartment.

Referring to FIGS. 6A-6C, an assist handle assembly 30 is illustrated having a storage compartment 36 located on an underside of the assist handle 32, generally located on a vehicle forward portion of the assist handle 32, according to another embodiment. In this embodiment, the storage compartment 36 likewise includes a holder configured as a pair of retention members 40A and 40B and a cover 38 for holding and concealing the assembly tool 70. By placing the storage compartment 36 on an underside of the assist handle 32, the assembly tool 70 is stored in a less obvious location hidden from view from passengers and passersby. It should be appreciated that the storage compartment 36 may be located elsewhere on the assist handle assembly 30.

Figure 7:
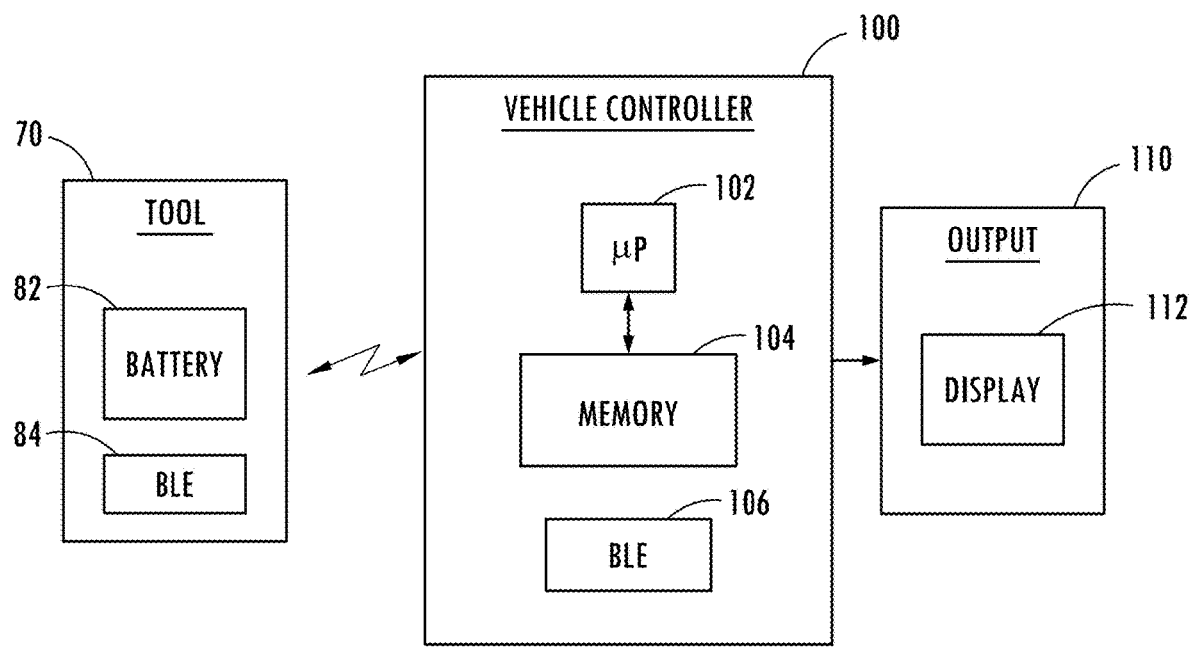
FIG. 7 is a block diagram illustrating communication of a vehicle controller with the assembly tool, according to one example.

Referring to FIG. 7, the assembly tool 70 is shown configured to communicate wirelessly with a vehicle controller 100. According to one embodiment, assembly tool 70 has a battery 84 and wireless communication circuitry 84, such as a Bluetooth® (BLE) transmitter that may communicate with wireless communication circuitry 106 (BLE) coupled to or associated with the vehicle controller 100. The vehicle controller 100 may include control circuitry, such as a microprocessor 102 and memory 104. The vehicle controller 100 may communicate with the assembly tool 70 and may generate one or more outputs 110 such as an indication of the location of the assembly tool 70. For example, the vehicle controller 100 may determine whether the assembly tool 70 is located on the vehicle 10 and within the storage compartment 36 or if the assembly tool 70 is displaced from the vehicle and storage compartment. The location of the assembly tool 70 and/or an indication that the assembly tool 70 is not detected in the storage compartment 36 or vehicle 10 may be displayed to a user via an output device 110 such as a vehicle display 112 as shown in FIG. 3 or via other human machine interface (HMI).

Accordingly, the assist handle assembly 30 advantageously provides for an assist handle having an assembly tool and a tool holder configured to assemble and disassemble the assist handle assembly 30 from a structural component of the vehicle 10. The assembly tool 70 and releasable connector 41 may enable the assist handle assembly 30 to be assembled, or disassembled, or to move to a new position within the vehicle with the assembly tool having a key surface that engages the releasable connector that connects the assist handle assembly 30 onto the vehicle structure. As a result, the unique assembly tool may be stored within the assist handle assembly such that a user may not easily disassembly and steal the assist handle assembly.

It should be appreciated that the assist handle assembly 30 may be located at one or more other locations on the vehicle 10, such as on the dashboard, a door side of the vehicle, a pillar and elsewhere on the vehicle 10. The assist handle assembly 30 may be an add-on assembly that can be assembled onto the vehicle 10 by a user with the releasable connectors, e.g., fasteners, that allow for easy assembly and disassembly of the assist handle assembly 30 from the vehicle 10. The assist handle assembly 30 may thereby replace another assembly such as an assist handle that does not have any accessories or has other accessories, for example.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An assist handle assembly for a vehicle, the assist handle comprising:
    an assist handle configured to be gripped by a user;
    a releasable connector configured to secure the assist handle assembly to a structural component of the vehicle, the connector comprising a fastener having a key surface;
    a storage compartment provided in the assist handle; and
    an assembly tool configured for engaging the key surface of the fastener during assembly and disassembly of the connector from the structural component of the vehicle, wherein the assembly tool is stored in the storage compartment.
2. The assist handle assembly of claim 1, wherein the storage compartment has a cover.
3. The assist handle assembly of claim 2, wherein the storage compartment further comprises a holder within the storage compartment for holding the assembly tool.
4. The assist handle assembly of claim 1, wherein the assembly tool comprises a screwdriver.
5. The assist handle assembly of claim 1, wherein the assembly tool comprises a wireless communication device for communicating with a wireless communication device on the vehicle to determine if the assembly tool is located on the assist handle assembly.
6. The assist handle assembly of claim 5, wherein the wireless communication device comprises a wireless signal transmitter.
7. The assist handle assembly of claim 6, wherein the assembly tool further comprises a battery.
8. The assist handle assembly of claim 5, wherein the wireless communication device on the vehicle communicates with a controller to determine the location of the assembly tool.
9. The assist handle assembly of claim 8, wherein the controller processes a wireless signal received from the assembly tool and determines the location based on strength of the wireless signal.
10. The assist handle assembly of claim 9, wherein the vehicle has a plurality of signal receivers for receiving the wireless signal, and wherein the controller determines the location based on signal triangulation.
11. The assist handle assembly of claim 9 further comprising an output device for indicating the location of the assembly tool.
12. The assist handle assembly of claim 11, wherein the output device comprises a display.
13. An assist handle assembly for a vehicle, the assist handle comprising:
    an assist handle configured to be gripped by a user;
    a releasable connector configured to secure the assist handle assembly to a structural component of the vehicle, the connector comprising a fastener having a key surface;
    a storage compartment provided in the assist handle, the storage compartment having a cover and a holder; and
    an assembly tool configured for engaging the key surface of the fastener during assembly and disassembly of the connector from the structural component of the vehicle, wherein the assembly tool is stored on the holder in the storage compartment.
14. The assist handle assembly of claim 13, wherein the assembly tool comprises a screwdriver.
15. The assist handle assembly of claim 13, wherein the assembly tool comprises a wireless communication device for communicating with a wireless communication device on the vehicle to determine if the assembly tool is located on the assist handle assembly.
16. The assist handle assembly of claim 15, wherein the wireless communication device comprises a wireless signal transmitter.
17. The assist handle assembly of claim 16, wherein the assembly tool further comprises a battery.
18. The assist handle assembly of claim 15, wherein the wireless communication device on the vehicle communicates with a controller to determine a location of the assembly tool.
19. The assist handle assembly of claim 13 further comprising an output device for indicating the determined location of the assembly tool.
20. The assist handle assembly of claim 19, wherein the output device comprises a display.

* * * * *

UNITED STATES PATENT AND TRADEMARK OFFICE
CERTIFICATE OF CORRECTION

| | | |
|---|---|---|
| PATENT NO. | : 11,254,252 B1 | Page 1 of 1 |
| APPLICATION NO. | : 17/032337 | |
| DATED | : February 22, 2022 | |
| INVENTOR(S) | : Salter et al. | |

It is certified that error appears in the above-identified patent and that said Letters Patent is hereby corrected as shown below:

In the Claims

Column 8:
Claim 19, Line 58;
"claim 13" should be --claim 18--.

Signed and Sealed this
Tenth Day of May, 2022

*Katherine Kelly Vidal*

Katherine Kelly Vidal
*Director of the United States Patent and Trademark Office*